(12) United States Patent
Ruoff

(10) Patent No.: US 9,912,262 B2
(45) Date of Patent: Mar. 6, 2018

(54) POSITIONING ARRANGEMENT FOR MOVING AN OBJECT THAT IS TO BE POSITIONED

(71) Applicant: Minebea Co., Ltd., Nagano-ken (JP)

(72) Inventor: Mario Ruoff, Constance (DE)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 15/264,752

(22) Filed: Sep. 14, 2016

(65) Prior Publication Data
US 2017/0077845 A1    Mar. 16, 2017

(30) Foreign Application Priority Data
Sep. 14, 2015 (DE) .......................... 10 2015 115 446

(51) Int. Cl.
*H02P 6/04* (2016.01)
*G05B 1/01* (2006.01)
*G05B 19/19* (2006.01)

(52) U.S. Cl.
CPC .................. *H02P 6/04* (2013.01); *G05B 1/01* (2013.01); *G05B 19/19* (2013.01); *G05B 2219/41264* (2013.01); *H02P 2205/00* (2013.01); *Y02P 90/265* (2015.11)

(58) Field of Classification Search
USPC ....... 318/264–266, 272, 275, 277, 282, 286, 318/466–469, 626
See application file for complete search history.

(56) References Cited

U.S. PATENT DOCUMENTS

| | | | | |
|---|---|---|---|---|
| 4,087,731 A * | 5/1978 | Rhoades | .............. | G05B 19/353 318/571 |
| 4,160,199 A * | 7/1979 | Bardwell | ............... | G06K 11/02 250/202 |
| 5,047,702 A * | 9/1991 | Hanaki | ................ | G05B 19/416 318/571 |
| 5,231,335 A * | 7/1993 | Mega | ................. | G05B 13/0275 318/625 |
| 5,748,465 A | 5/1998 | Kaneko | | |
| 6,445,147 B1 | 9/2002 | Saitoh et al. | | |
| 6,823,235 B2 * | 11/2004 | Toyozawa | ............ | G05B 19/186 318/632 |

(Continued)

FOREIGN PATENT DOCUMENTS

| DE | 19616855 | 1/1997 |
|---|---|---|
| DE | 10051638 | 7/2001 |

(Continued)

*Primary Examiner* — Bentsu Ro
(74) *Attorney, Agent, or Firm* — Volpe and Koenig, P.C.

(57) ABSTRACT

A positioning arrangement is provided for moving an object that is to be positioned (9) with at least one positioning axis (11), wherein at least two electric motors (6) for moving the object that is to be positioned (9) are assigned to at least one positioning axis (11). Each electric motor (6) has its own separate control circuit (2), wherein the control circuits (2) are designed in each case to receive adjustment requests for a positioning direction. The control circuits (2) are furthermore designed in each case to evaluate the adjustment request and the electric motors (6) are interconnected via a communication interface (13). The adjustment requests and the movement commands to control the electric motors (6) can be exchanged via this communication interface (13).

15 Claims, 3 Drawing Sheets

(56) References Cited

U.S. PATENT DOCUMENTS

| | | |
|---|---|---|
| 6,925,349 B2 | 8/2005 | Albrecht et al. |
| 7,746,011 B2 | 6/2010 | Gerding et al. |
| 8,344,678 B2 | 1/2013 | Koshobu |
| 2013/0110278 A1 | 5/2013 | Okita et al. |

FOREIGN PATENT DOCUMENTS

| | | |
|---|---|---|
| DE | 10248690 | 5/2003 |
| DE | 10249092 | 5/2004 |
| DE | 102010017549 | 1/2011 |
| DE | 102012021047 | 5/2013 |

* cited by examiner

POSITIONING ARRANGEMENT FOR MOVING AN OBJECT THAT IS TO BE POSITIONED

INCORPORATION BY REFERENCE

The following documents are incorporated herein by reference as if fully set forth: German Patent Application No. 102015115446.3, filed Sep. 14, 2015.

BACKGROUND

The invention relates to a positioning arrangement for moving an object that is to be positioned, with at least two electric motors for moving the object that is to be positioned, wherein at least two electric motors are provided in each case for each positioning axis, with an actuation element for each positioning direction with which an adjustment request can be triggered, and with a control circuit to evaluate the adjustment requests and to control the electric motors.

Positioning arrangements of this type are used if, for example, wide objects that are to be positioned have to be moved but are not sufficiently rigid over their width to be driven by an electric motor. An awning, for example, which consists of a wide panel of material and is provided with electric motors on both sides to extend or retract it.

A further example of a positioning arrangement of this type is the drive unit for a convertible vehicle top, wherein an electric motor with which the top can be opened or closed is arranged on each side of the top.

A common feature of each of these applications is that it must always be ensured that the two electric motors are moved absolutely synchronously. If one of the motors starts or stops earlier, this results in a twisting of the object that is to be positioned. The object that is to be positioned can be blocked, damaged or destroyed as a result.

The synchronous control is performed in the prior art by a central control circuit to which the actuation elements and the electric motors are connected. The control circuit evaluates the switching commands of the actuation elements, checks their validity and then controls the electric motors simultaneously and synchronously. It is thus ensured, for example, that one motor is not moved in one positioning direction while the other is moved in the other positioning direction. Similarly, it can thereby be ensured that the electric motors move at the same speed and coordinated positioning paths are travelled.

Multi-phase brushless DC motors (BLDC motors) are increasingly used in modern positioning arrangements. To control multi-phase electric motors of this type, the control circuit additionally requires a motor driver which transforms the DC voltage into the phase alternating voltages.

These require a cable connection to the control circuit for each motor phase, so that a very large number of lines must be installed along with the cable connections to the actuation elements. As a result, the proneness to faults and installation cost are very high.

Many BLDC motors also exist which are equipped with their own motor drivers which are activated via bus systems. These BLDC motors require no motor drivers in the central control unit for the synchronous control. However, this means that the available control circuits have unnecessary functional units, thereby incurring additional costs.

SUMMARY

The object of the invention is therefore to produce a positioning arrangement for BLDC motors of the aforementioned type which enables a simple and low-cost implementation.

This object is achieved according to the invention by a positioning arrangement with one or more features of the invention.

Instead of a central control circuit, each electric motor has its own separate control circuit according to the invention.

The positioning arrangement is designed to move an object that is to be positioned, wherein the positioning arrangement has one or more positioning axes. At least two electric motors for moving the object that is to be positioned are assigned to at least one positioning axis. According to the invention, each electric motor has its own separate control circuit. The control circuits are then designed in each case to receive and evaluate adjustment requests for a positioning direction. The electric motors are interconnected via a communication interface so that they can exchange the adjustment requests and movement commands with one another to control the electric motors. It can similarly be provided that status information and movement parameters of the electric motors are exchanged via the communication interface. For example, various parameters and adjustment quantities, such as the adjustment speed or the adjustment path travelled, can be exchanged. A synchronous movement can thus be achieved and, if necessary, monitored.

The control circuits are preferably connected to a switch control circuit, wherein the switch control circuit provides the adjustment requests for the control circuits. For example, the switch control circuit may be connected to one or more switches. The switch control circuit can then receive the adjustment request initiated by the actuation of an actuation element and can transmit a corresponding adjustment request to the control circuit for the selected adjustment direction. The adjustment request originally generated by the actuation element can simply be forwarded by the switch control circuit or can be electronically processed before being transmitted to the control circuits.

The actuation element may, for example, be a switch, a slide control, a rotary control or a button. It is therefore also preferred for the switch control circuit to be connected to one or more actuation elements, wherein the switch control circuit transmits an adjustment request to the respective control circuit following the actuation of an actuation element.

In other designs of the invention, it is preferred if the control circuits are in each case connected directly to an actuation element and the actuation element transmits the switching command directly to the respective control circuit. The control circuits of the electric motors thus also perform the function of the switch control unit to receive the adjustment request from the actuation element. In this advantageous design of the invention, the control circuits of the electric motors are designed to process the adjustment requests generated via the actuation elements without the need for electronic processing by an additional switch control unit. In such designs of the invention, the control circuits of the electric motors are furthermore designed to generate movement commands to control the electric motors and exchange said commands with one another.

In some designs of the invention, it is preferred for exactly one actuation element to be assigned to each positioning direction. The adjustment requests triggered by the actuation elements can then, for example, be forwarded directly or via a switch control device to the control circuits.

For each positioning direction of the positioning arrangement, one of the control circuits is connected to an actuation element for this positioning direction and is designed to evaluate the adjustment request from this actuation element. This means that no additional functional unit is required, even if BLDC motors are used, which very often have their own motor drivers. To enable a synchronous control of the individual electric motors of a positioning axis, the electric motors of this positioning axis are interconnected according to the invention via an additional communication interface. The adjustment requests from all actuation elements of a positioning axis are exchangeable via this communication interface. This means that the control circuits of all electric motors which essentially form the functional unit for synchronising the electric motors involved in a positioning operation form a group. Furthermore, the control circuits of the electric motors can also replace the functional unit for evaluating the adjustment requests generated by one or more actuation elements or by a switch control circuit. According to the invention, not only adjustment requests from the actuation elements but also movement commands to control the electric motors can thus be exchanged via the communication interface. In some designs of the invention, status information of the motors is reciprocally exchanged. This also serves to protect the system as a whole against possible faults on one of the drives. The status information may relate to one or more of the following aspects: a mechanical blocking of the actuator or object that is to be positioned; a voltage fault, such as, for example, overvoltage or undervoltage; a temperature fault, in particular the exceeding or understepping of a permitted maximum temperature or minimum temperature on the actuator; or a step loss of an electric motor. A suitable fault response of the system as a whole can be implemented through the exchange of status information of this type between the participating control circuits of the electric motors. It can be provided that one of the control circuits receives and monitors the status information of all actuators participating in a positioning operation. For example, it can be monitored whether all parameters are within a predefined tolerance range and/or whether an adjustment operation is expected to be carried out. It can thus be provided that a phase current applied to control an electric motor is monitored, wherein a blocking of the adjustment operation is inferred if a maximum current value is exceeded. Alternatively, a blocking can be detected via the signals of one or more position sensors, for example Hall sensors. If the control circuit responsible for monitoring the status information detects a fault, a corresponding fault message can be output and/or a positioning operation can be aborted, or the start of a positioning operation can be prevented. It can similarly be provided, that the control circuit transmits the status information to a display apparatus. In the case of an adjustment apparatus for opening and closing a convertible top, fault messages, the adjustment direction or the remaining adjustment time duration can be presented on a display in the passenger compartment of the vehicle.

An electric motor has only one positioning axis and therefore two positioning directions. It is therefore normally sufficient if one actuation element is present in the group for each positioning direction. However, it may be totally appropriate or necessary, for example in the case of very large or multi-part objects that are to be positioned, for more than two electric motors to be present in the positioning arrangement. In this case, a third or further electric motor can also be operated without an actuation element. An electric motor of this type is then merely a receiver of movement commands.

Each motor and therefore each control circuit can be designed identically. This means that all control circuits independently carry out a validity check following the exchange of adjustment requests and control the electric motor accordingly. There is, however, a risk that one of the control circuits does not make a correct decision and controls the electric motor incorrectly, as a result of which the synchronization between the motors is not guaranteed.

One of the electric motors is therefore appropriately configured as the master. The master forms the command centre for all electric motors connected via the communication interface. The master receives all adjustment requests and only the master transmits movement commands to the other electric motors which control the electric motors with these movement commands. For example, it can be provided that the master cyclically polls all adjustment requests. The polling comprises not only the electric motor configured as the master but also the electric motors configured as slaves. An adjustment request to one electric motor configured only as a slave, without an adjustment request from the master, can also result in an adjustment of the system as a whole.

A corresponding method appropriately performs the following steps.

Determination of the adjustment requests present on all electric motors by the electric motor configured as the master. The master therefore indirectly polls the adjustment requests from all actuation elements. When one of the other electric motors registers an adjustment request from an actuation element, this adjustment request is forwarded to the master.

A validity check can be performed only if the current adjustment requests from all electric motors are present in the master.

If the validity of an adjustment request is confirmed, a corresponding movement command is transmitted from the master to all other electric motors connected via the communication interface, so that all electric motors in the group move simultaneously and synchronously in the positioning direction requested by the actuation element. It can thus be ensured at all times that only valid adjustment requests are converted into a motor movement and the movement is performed absolutely synchronously.

The determination of all adjustment requests present on the electric motors by the electric motor configured as the master preferably comprises the following steps:

Transmission of a query to determine whether an adjustment request is present from the control circuit of the electric motor configured as the master to all control circuits of the other electric motors, and forwarding of the adjustment requests registered by the control circuits of the other electric motors to the control circuit of the electric motor configured as the master.

Alternatively, it can also be provided that the electric motor configured as the master does not send a query to determine whether an adjustment request is present on one of the other electric motors, but rather the control circuits of all other electric motors notify the master cyclically whether an adjustment request is present.

The communication interface for connecting the individual electric motors can be designed in more or less any manner. The communication interface is preferably designed as a bus interface or as a PWM interface. It is particularly preferred that the communication interfaces are designed as a LIN interface and are interconnected via a LIN connection. The communication interface may be part of a bus system. In some designs of the invention, the communication interface is designed as a private connection which interconnects only the electric motors in the group. Instead of a bus system, a different communication interface, for example a PWM (Pulse Width Modulation) interface, can also be used.

Alternatively, a CAN bus or a different interface can also be provided.

The configuration of the electric motors, in particular as the master, is appropriately performed via a configuration means connected to the LIN connection. The configuration means is preferably a personal computer (PC) with a corresponding interface configuration program. A connection by means of a portable computer, for example by means of a notebook, a tablet computer or a Smartphone, can similarly be provided for the configuration. The connection between the configuration means and a UN interface of the electric motor may be established, for example, via a USB (Universal Serial Bus)-LIN adapter. Alternatively, other adapters can also be used, so that the described communication means can also be connected to a different interface, for example a PWM interface.

BRIEF DESCRIPTION OF THE DRAWINGS

The invention is explained in detail below on the basis of a preferred design with reference to the attached drawings.

In the drawings.

DETAILED DESCRIPTION OF THE PREFERRED EMBODIMENTS

Figure 1:
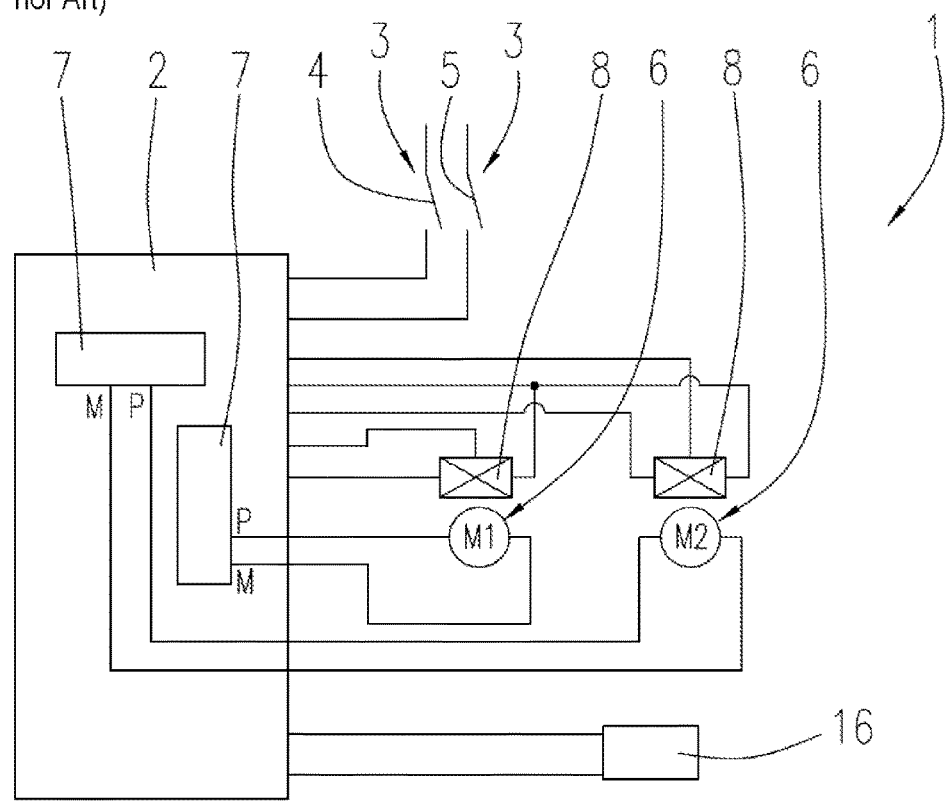
FIG. 1: shows a block diagram of a positioning arrangement according to the prior art.

FIG. 1 shows a block diagram of a positioning arrangement 1 according to the prior art with a central control circuit 2 to which two actuation elements 3 are connected. Each actuation element 3 generates an adjustment request for a movement direction of the positioning arrangement 1. In the example, the positioning arrangement 1 is a top drive for the opening and closing of a convertible top (not shown) by means of an electric motor. The first actuation element 4 is therefore for opening the top, the second actuation element 5 for closing it.

For this purpose, the positioning arrangement 1 has two electric motors 6 which, in the example, are designed in each case as single-phase brushless DC motors. Arrangements are similarly known in which the electric motors 6 are designed as three-phase brushless DC motors (BLDC motors). The control circuit 2 also has the motor drivers 7 to control the DC motors or the three motor phases U, V, W of a BLDC motor. The motor windings of the two DC motors shown are connected to the voltage signals P and M provided in each case by the motor drivers 7. Similarly, in the case of three-phase BLDC motors, the phase windings are connected in each case to the corresponding motor driver 7.

The electric motors 6 additionally have position sensors 8 via which the control circuit 2 can define the absolute position of the electric motors.

The adjustment requests from the actuation element 3 are checked for validity in the control circuit 2 and are converted into movement commands to control the two electric motors 6.

An adjustment request is valid only if only one actuation element 3 is actuated in each case. In the example, this means that the top cannot be simultaneously opened and closed. If the two actuation elements 4 and 5 are actuated simultaneously, either no movement command can be generated, or one positioning direction can be preferred. The top can, for example, then be closed.

In the case of a valid adjustment request, the two electric motors 6 are controlled synchronously, which is also guaranteed via the position data of the position sensors. It can be ensured by a synchronous control that the object that is to be positioned is not tilted and damaged.

On the whole, an elaborate cabling is required in this positioning arrangement, as a result of which the arrangement is expensive and prone to faults.

Figure 2:
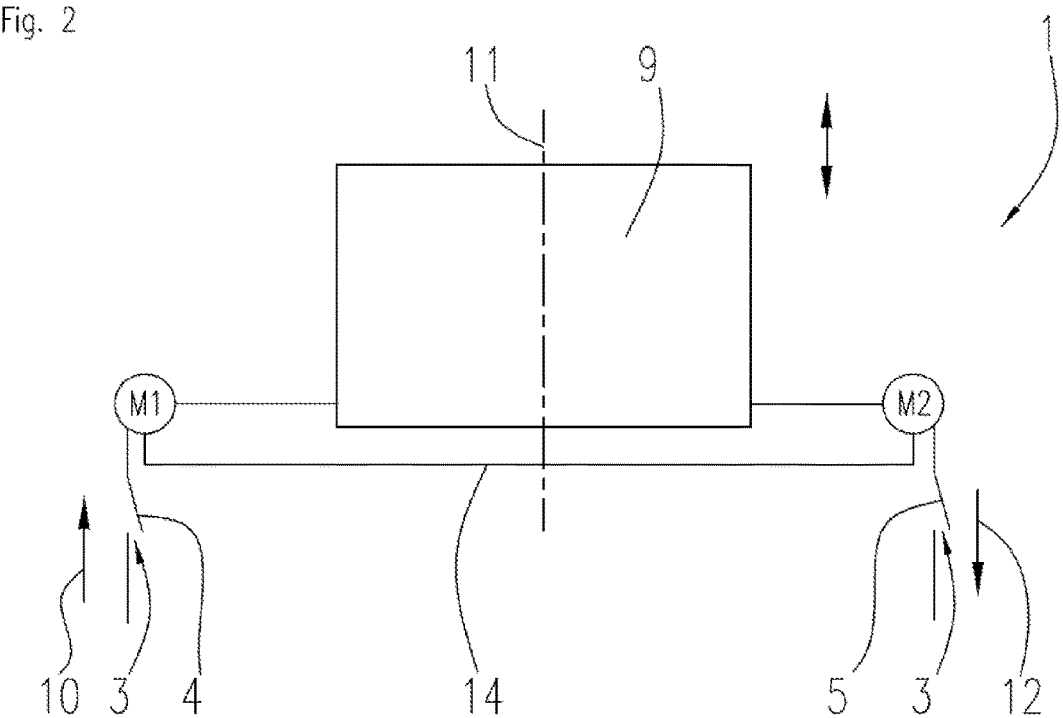
FIG. 2: shows a positioning arrangement according to the invention.

FIG. 2 shows an example of a positioning arrangement 1 according to the invention for moving an object that is to be positioned 9. The object that is to be positioned 9 is a convertible top in this example also. For this purpose, the positioning arrangement 1 has two electric motors 6 which are similarly designed as BLDC motors. Each control circuit 2 has a motor driver 7 which is connected to the motor phases U, V, W and generates the AC voltages required for operation. The motor driver 7 may, for example, have an inverter with a full-bridge circuit for this purpose. The electric motors 6 can move the object that is to be positioned 9 in two positioning directions 10 and 12 along a positioning axis 11.

Figure 3:
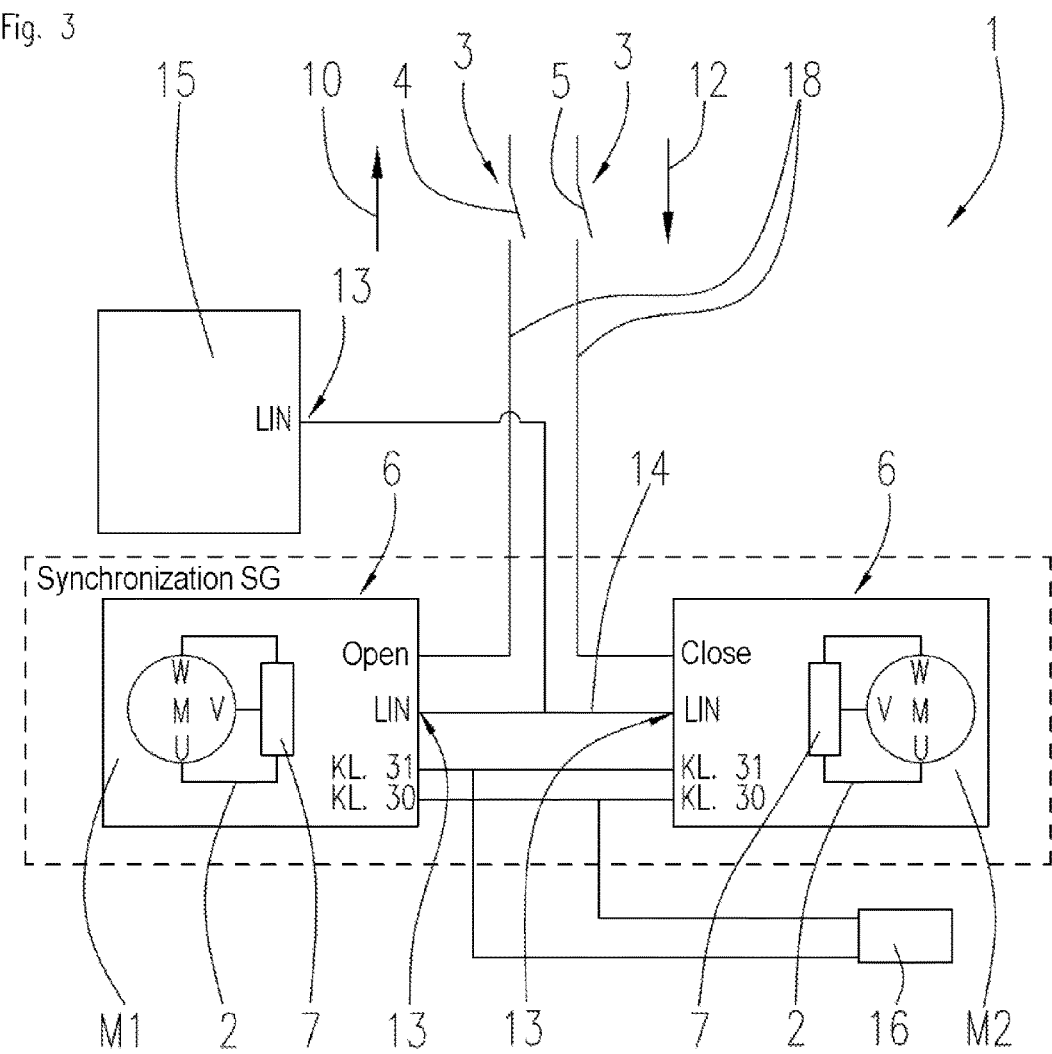
FIG. 3: shows a block diagram of the positioning arrangement shown in FIG. 2, and FIG. 4: shows a block diagram of an alternative design of the positioning arrangement from FIG. 2.

A block diagram of the positioning arrangement is shown in FIG. 3. According to the invention, each electric motor 6 now has a control circuit 2 which also contains the motor driver 7 to control the motor phases. Each electric motor 6 is furthermore connected via a control line 18 to an actuation element 3. The first electric motor M1 is connected to the first actuation element 4 to open 10 the top 9, the second electric motor M2 is connected to the second actuation element 5 to close 12 the top 9.

The two electric motors 6 are furthermore connected to an operating voltage source 16 which is not specified in detail and is irrelevant to the invention.

So that the two electric motors 6 can be controlled synchronously with an adjustment request from one of the actuation elements 3, the two electric motors 6 additionally have a LIN interface 13. The LIN interfaces 13 of the two electric motors 6 are interconnected via a LIN connection 14.

The figure furthermore shows a PC 15 which is similarly connected via the LIN connection 14 to the LIN interfaces 13 of the two electric motors 6. However, the PC 15 is required only for the one-off configuration of the LIN interfaces 13 of the two electric motors 6. In normal operation, it is not necessary. A different suitable configuration device can also be used instead of the PC 15.

In the example, the first electric motor M1 is configured as the master. This means that only the motor M1 can transmit movement commands. The second electric motor M2 is configured as a receiver.

The positioning arrangement 1 is operated, for example, according to the following method.

If the first actuation element 4 is actuated to open 10 the top 9, the corresponding adjustment request is registered in the control circuit 2 of the first motor M1. The motor M1 then polls the motor M2 via the LIN interface 13 for the presence of an adjustment request by actuating the second actuation element 5. From the two adjustment requests, it is determined in the control circuit 2 of the first motor M1 whether the top 9 is allowed to be opened. Further sensor values, for example position sensors of the top or other sensor values which do not, however, play an essential role in the invention, can be taken into account for this decision.

If the second actuation element 5 is not actuated in this case and all other possible conditions are also fulfilled, the adjustment request is valid and the top 9 can be opened. To do this, a movement command is transmitted via the LIN interface 13 to the motor M2 so that the two motors M1 and M2 are moved synchronously in the open positioning direction 10.

If the second actuation element 5 is actuated, the second motor M2 transmits the adjustment request to the master M1. The master M1 then also checks the adjustment request from the first switch 4 and again determines the validity of the adjustment request here also and transmits the movement command accordingly to close 12 the top 9.

However, following the reception of a movement command, the electric motors 6 are controlled autonomously by the control circuit 2 of the respective electric motor 6. No position information is exchanged between the two electric motors 6 via the LIN interface 13. The position data may, for example, comprise the signals of one or more all sensors or may be derived therefrom. It can similarly be provided that the position data are determined without sensors. In order to guarantee a synchronous movement of the electric motors 6, the movement command may, for example, contain a final position and a speed or a speed and a movement duration. A speed may also be predefined, so that the electric motor is started simply by a start movement command and is operated until a stop movement command. There are numerous other operating modes which may be advantageous according to the application. The invention is therefore in no way restricted to one of the aforementioned operating modes.

As an alternative to the second electric motor M2 transmitting its present adjustment requests, the master M1 can also poll the second motor M2 for the presence of an adjustment request generated by the second actuation element 5 (polling). The control circuit 2 of the second electric motor M2 becomes simpler as a result, since it only has to respond to queries and does not have to actively transmit. However, depending on the polling interval, the response time may be long after which an actuation of the second actuation element 5 is detected.

In a further design of the invention, it may be provided, for example, that the adjustment request from the second actuation element 5 is mapped at regular intervals on the LIN interface 13 so that the query can be dispensed with and the LIN interface 13 can be directly read in the master. Movement commands can then be transmitted only in the gaps between these intervals.

Numerous further variants are conceivable here also, and for this reason the invention is not intended to be restricted here either to one of the aforementioned options. In particular, it may also be provided in other designs of the invention that the adjustment requests from the actuation element 3 are received by a switch control circuit and the switch control circuit 17 forwards corresponding adjustment requests to the control circuits 2 of the electric motors.

Figure 4:
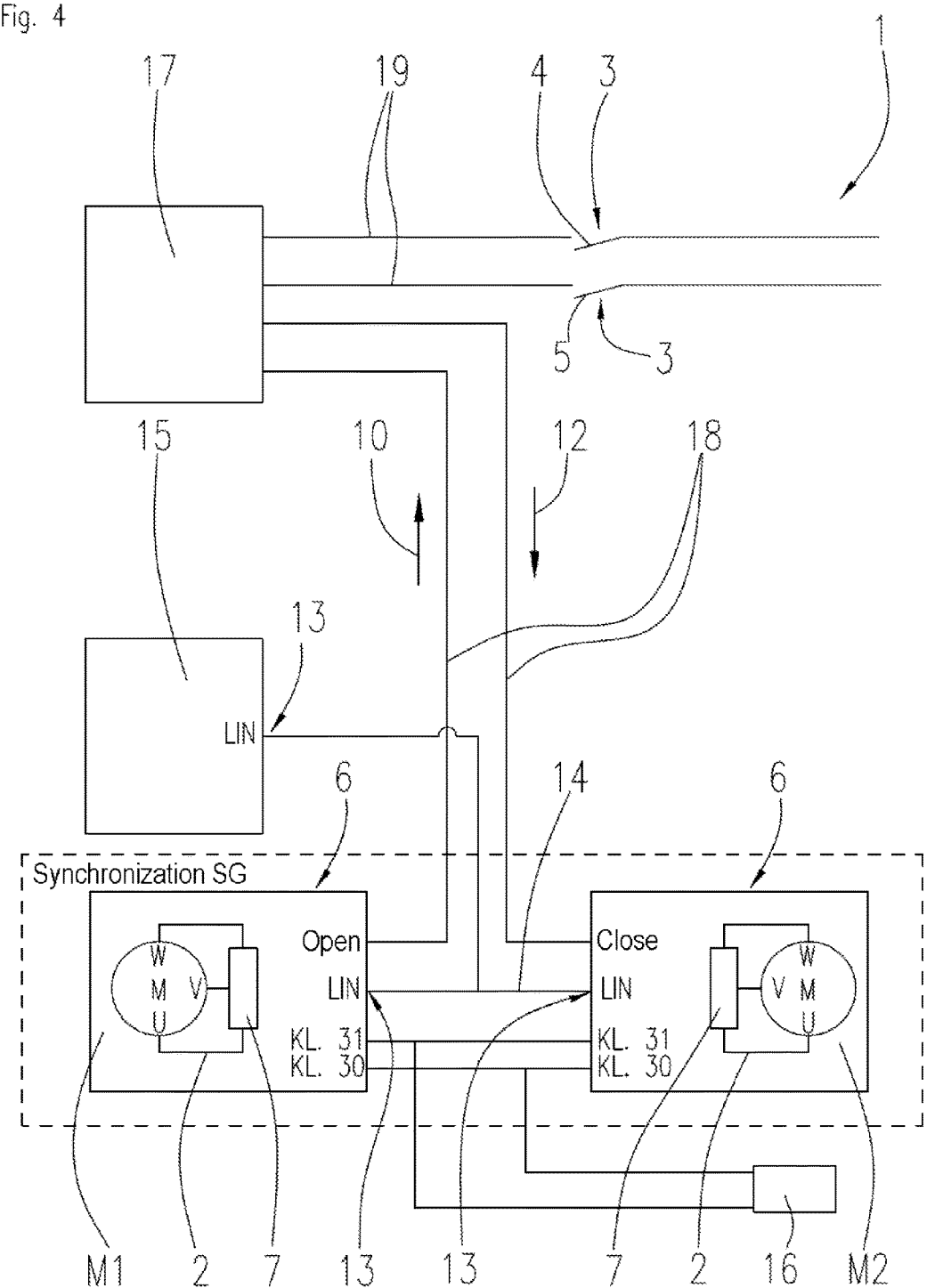

FIG. 4 shows an example of an alternative design of a positioning arrangement 1 according to the invention for moving an object that is to be positioned 9. In comparison with the positioning arrangement shown in FIG. 3, an additional switch control circuit 17 is provided here which is connected via control lines 19 to the actuation element 3. An adjustment request triggered through actuation of an actuation element 3 is then registered by the switch control circuit 17. The switch control circuit 17 is in turn connected via control lines 18 to the control circuits 2 of the electric motors 6 and is designed to transmit a corresponding adjustment request to the respective control circuit 2 or to forward the switching command received from the actuation element 3. An additional switch control circuit 17 which is designed to process and/or forward the adjustment requests from the actuation element 3 is therefore interposed between the control circuits 2 of the electric motors 6 and the actuation elements 3. The two actuation elements 3 can obviously also be combined in all embodiments into a single actuation element. For example, a switch or controller with a plurality of switching positions can be used.

The advantage of the invention now also lies in that the two electric motors can be manufactured identically, as a result of which production costs are reduced. The configuration as the master or receiver is then not implemented until later, for example during installation. However, a pre-configuration can also be performed immediately following production. Furthermore, there is no need for a separate control circuit which similarly incurs additional costs and cabling outlay. On the whole, the positioning arrangement according to the invention is therefore usable in a highly flexible manner and at low cost for a variety of applications.

REFERENCE NUMBER LIST

1 Positioning arrangement
2 Control circuit
3 Actuation element
4 First actuation element
5 Second actuation element
6 Electric motor
7 Motor driver
8 Position sensor
9 Object that is to be positioned (convertible top)
10 Positioning direction (open)
11 Positioning axis
12 Positioning direction (close)
13 Communication interface LIN interface)
14 Communication connection (LIN connection)
15 PC
16 Voltage source
17 Switch control circuit
18 Control line
19 Control line
P, M Voltage signals

The invention claimed is:

1. A positioning arrangement for moving an object that is to be positioned (9) with at least one positioning axis (11), comprising at least two electric motors (6) for moving the object that is to be positioned (9), which are assigned to the at least one positioning axis (11), each said electric motor (6) has a separate control circuit (2) of its own, the control circuits (2) are configured in each case to: (A) receive adjustment requests for a positioning direction, and (B) evaluate the adjustment request, and the electric motors (6) are interconnected via a communication interface (13) via which the adjustment requests and movement commands to control the electric motors (6) are exchangeable.

2. The positioning arrangement according to claim 1, wherein the control circuits (2) are connected to a common switch control circuit (17) and a switch control circuit (17) transmits the adjustment requests to the control circuits (2) of the electric motors (6).

3. The positioning arrangement according to claim 2, wherein the switch control circuit (17) is connected to one or more actuation elements (3), the switch control circuit (17) transmits an adjustment request to the respective control circuit (2) following actuation of one of the actuation elements (3).

4. The positioning arrangement according to claim 1, wherein the control circuits (2) are connected in each case directly to an actuation element (3), and the actuation element (3) transmits the adjustment request to the respective control circuit (2).

5. The positioning arrangement according to claim 4, wherein exactly one actuation element (3) is assigned to each positioning direction.

6. The positioning arrangement according to claim 1, wherein the communication interface (13) is a bus interface or a PWM interface.

7. The positioning arrangement according to claim 6, wherein the communication interface (13) is a bus interface and the first electric motor (6, M1) is configured as a master which can poll and receive the adjustment requests from actuation elements (3) of a second electric motor (6, M2) and transmits movement commands via the communication interface (13).

8. A method for operating a positioning arrangement according to claim 6, wherein the communication interface (13) is a bus interface, and a first one of the electric motors (6; M1, M2) is configured as a master, the method, following an actuation of the actuation elements, comprises the following steps:
   determining the adjustment requests present on all of the electric motors (6; M1, M2) by the first electric motor (6; M1) configured as the master, and
   checking of a validity of the determined adjustment requests by the first electric motor (6; M1) configured as the master, and
   transmitting at least one movement command from the first electric motor (6; M1) configured as the master to all other ones of the electric motors (6; M2) connected via the communication interface (13) if a valid adjustment request is present.

9. The method according to claim 8, wherein, following reception of the at least one movement command, all of the electric motors (6; M1, M2) in the group move simultaneously and synchronously in a positioning direction requested by the actuation element (3).

10. The method according to claim 8, wherein a determination of all of the adjustment requests present on the electric motors (6; M1, M2) by the first electric motor (6; M1) configured as the master comprises the following steps:
    transmitting a query to determine whether an adjustment request is present, from the control circuit (2) of the first electric motor (6; M1) configured as the master to all control circuits the other electric motors (6; M2), and
    forwarding of the adjustment requests registered by the control circuits (2) of the other electric motors (6; M2) to the control circuit (2) of the electric motor (6; M1) configured as the master.

11. The positioning arrangement according to claim 1, wherein the communication interface (13) is designed as a PWM interface.

12. The positioning arrangement according to claim 1, wherein status information of the electric motors (6) is exchanged between the control circuits (2) via the communication interface (13).

13. The positioning arrangement according to claim 12, wherein the status information comprises at least one of the following information elements: a fault message, a position datum, an adjustment path travelled, a phase current of an electric motor (6), a temperature, an adjustment speed or a supply voltage of an electric motor (6).

14. The positioning arrangement according to claim 1, wherein the electric motors (6) are brushless DC motors.

15. A positioning arrangement for opening and closing a convertible top (9), comprising an electric motor (6) on each side of the top, with a first actuation element (4) for opening (10) the top (9) which is connected to a first one of the electric motors (6; M1) and a second actuation element (5) for closing (12) the top (9) which is connected to a second one of the electric motors (6; M2), wherein the two electric motors (6; M1, M2) are interconnected via a LIN connection (14) via which switching positions of the two actuation elements (4, 5) for a validity check and movement commands are exchanged between the electric motors (6; M1, M2).

\* \* \* \* \*